US008798194B2

(12) United States Patent
Jechoux et al.

(10) Patent No.: US 8,798,194 B2
(45) Date of Patent: *Aug. 5, 2014

(54) ADAPTIVE COMPENSATION OF NONLINEAR FREQUENCY DISTORTION IN POLAR TRANSMITTERS BASED ON A LEAST SQUARES ESTIMATION

(75) Inventors: Bruno Jechoux, Antibes (FR); Giuseppe Li Puma, Bochum (DE); Yanzhong Dai, Xi'an (CN)

(73) Assignee: Intel Mobile Communications GmbH, Neubiberg (DE)

( * ) Notice: Subject to any disclaimer, the term of this patent is extended or adjusted under 35 U.S.C. 154(b) by 273 days.

This patent is subject to a terminal disclaimer.

(21) Appl. No.: 13/326,749

(22) Filed: Dec. 15, 2011

(65) Prior Publication Data

US 2013/0156083 A1    Jun. 20, 2013

(51) Int. Cl.
*H04L 25/49* (2006.01)

(52) U.S. Cl.
USPC .......................................................... 375/296

(58) Field of Classification Search
USPC ................. 375/285, 295–296; 455/63.1, 501, 455/112.2, 114.3
See application file for complete search history.

(56) References Cited

U.S. PATENT DOCUMENTS

| 6,101,224 | A | 8/2000 | Lindoff et al. |
| 6,566,944 | B1 | 5/2003 | Pehike et al. |
| 7,020,070 | B2 | 3/2006 | Lindoff |
| 7,599,418 | B2 * | 10/2009 | Ahmed .......................... 375/135 |
| 7,929,637 | B2 * | 4/2011 | Staszewski et al. ........... 375/295 |
| 7,991,071 | B2 * | 8/2011 | Hietala .......................... 375/296 |
| 8,009,756 | B2 | 8/2011 | Ishikawa et al. |
| 8,130,865 | B2 * | 3/2012 | Schimper et al. ............. 375/296 |
| 2005/0129140 | A1 | 6/2005 | Robinson |
| 2009/0207940 | A1 | 8/2009 | Staszewski et al. |
| 2010/0246714 | A1 | 9/2010 | Yang et al. |

OTHER PUBLICATIONS

Non-Final Office Action dated Nov. 7, 2013 for U.S. Appl. No. 13/326,679. 17 Pages.
Notice of Allowance dated Sep. 16, 2013 for U.S. Appl. No. 13/326,712.
U.S. Appl. No. 13/326,712, filed Dec. 15, 2011.
U.S. Appl. No. 13/326,679, filed Dec. 15, 2011.
Office Action Dated Apr. 8, 2014 U.S. Appl. No. 13/326,679.
Notice of Allowance Dated May 30, 2014 U.S. Appl. No. 13/326,679.

* cited by examiner

*Primary Examiner* — Khanh C Tran
(74) *Attorney, Agent, or Firm* — Eschweiler & Associates, LLC (57) ABSTRACT

The present invention relates to a communication system having a digital to analog converter, a first input, a summation component, and a compensation unit. The converter is configured to receive a first. The first input is configured to receive a phase modulation signal. The compensation unit includes one or more inputs and is configured to measure amplitude samples of the first signal at a first of the one or more inputs and to generate a correction signal according to the one or more inputs. The correction signal at least partially accounts for estimated distortions of the phase modulation signal from the amplitude modulation path. The summation component is configured to receive the phase modulation signal and the correction signal and to generate a corrected phase modulation signal as a result.

20 Claims, 9 Drawing Sheets

ADAPTIVE COMPENSATION OF NONLINEAR FREQUENCY DISTORTION IN POLAR TRANSMITTERS BASED ON A LEAST SQUARES ESTIMATION

BACKGROUND

Power efficiency for transceiver architectures has become an important issue for portable handheld devices. Next generation wireless communication systems, Bluetooth, WLAN, GSM-EDGE, and the like, employ non-constant envelope modulation schemes in order to achieve high data-rates. Traditional designs of RF-modulator concepts employ vector modulator architectures which operate essentially as a single-sideband up-converter (SSB) using two digital-to-analog converters (DAC), two mixers and a linear power amplifier (PA). However, these architectures are power inefficient because they require a complete linear signal path. Further, the vector modulator concept requires a separation of the transceiver and the power amplifier on the mobile printed circuit board (PCB) in order to avoid parasitic coupling of the output signal into the VCO. Therefore the vector modulator transmitter approach has been replaced in some architectures by the polar modulator concept.

The polar modulator concept separates the modulation signal into an amplitude modulation (AM) signal and a phase modulation (PM) signal. The symbols or points used in polar modulation correspond or translate from Cartesian coordinates utilized in vector modulation concepts. The polar modulation concept provides power efficiency advantages, among others. However, the AM path can introduce distortions into the PM path, resulting in data loss, reduced bandwidth, and the like.

DETAILED DESCRIPTION

The present invention includes systems and methods that estimate distortions to a phase modulation signal and provide a correction signal based on the estimate to correct or mitigate distortions of the phase modulation signal. The distortions include those resulting from amplitude modulation to frequency modulation effects. The estimated distortions are at least partially calculated during an initial portion of a communication sequence. Then, the estimated distortions are used with one or more other inputs to generate the correction signal. The correction signal is combined with a phase modulation signal.

One embodiment of the present invention relates to a communication system having a digital to analog converter, a first input, a summation component, and a compensation unit. The converter is configured to receive an amplitude modulation signal. The first input is configured to receive a phase modulation signal. The compensation unit includes one or more inputs and is configured to measure amplitude samples of the amplitude modulation signal at a first of the one or more inputs and to generate a correction signal according to the one or more inputs. The correction signal at least partially accounts for estimated distortions of the phase modulation signal from the amplitude modulation path. The summation component is configured to receive the phase modulation signal and the correction signal and to generate a corrected phase modulation signal as a result. Other embodiments and variations thereof are disclosed below.

The present invention will now be described with reference to the attached drawing figures, wherein like reference numerals are used to refer to like elements throughout, and wherein the illustrated structures and devices are not necessarily drawn to scale.

Figure 1:
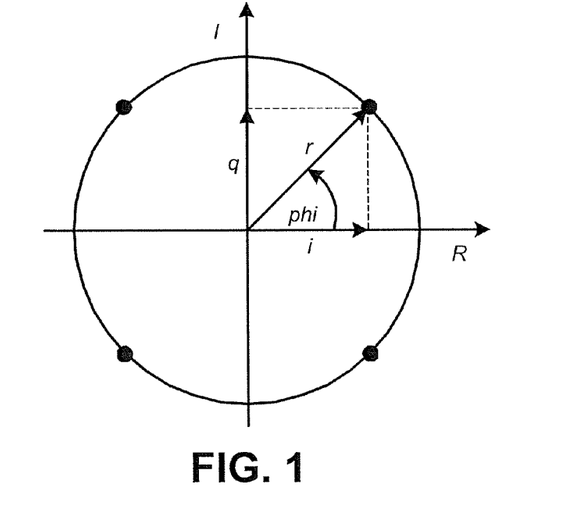
FIG. 1 shows a constellation diagram of a QPSK-signal.

FIG. 1 shows a constellation diagram of a QPSK-signal. Phase shift keying (PSK) is a digital modulation scheme that conveys data by changing, or modulating, the phase of a reference signal, which is sometimes referred to as a carrier signal. Quadrature phase shift keying (QPSK) is an example of phase shift keying (PSK), which uses four phases.

A convenient way to represent PSK and QPSK is by utilizing a constellation diagram, such as that shown in FIG. 1. The constellation diagram shows the symbols or points in the Argand plane where the real and imaginary axes are termed the in phase and quadrature axes respectively, due to their ninety degrees phase separation.

The symbols are distributed on a circle with a distance of 90 degrees. The geometric location of symbols can be expressed in Cartesian coordinates $i(t)+j \cdot q(t)$ or polar coordinates $r(t)e^{j\text{phase}(t)}$. Both expressions are equivalent and can be transformed into each other.

Figure 2:
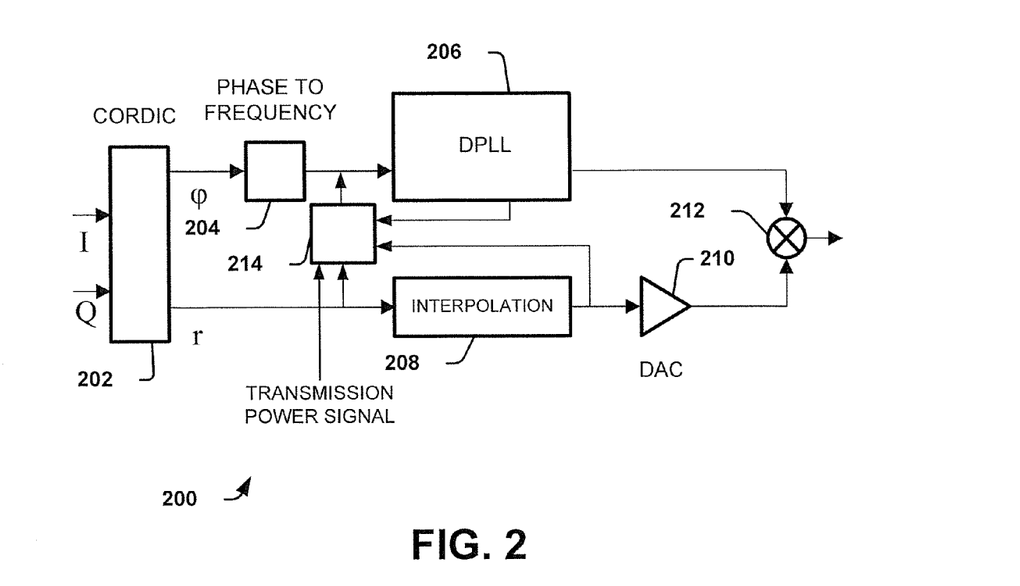
FIG. 2 is a simplified diagram illustrating a communication system employing polar modulation in accordance with an embodiment of the invention.

FIG. 2 is a simplified diagram illustrating a communication system 200 employing polar modulation in accordance with an embodiment of the invention. The system 200 includes a conversion component 202, a phase to frequency converter 204, a digital phase locked loop (DPLL) 206, an interpolation component 208, a digital to analog converter (DAC) 210, a mixer or combiner 212, and a compensation unit 214.

A processor (not shown) is configured to generate orthogonal in-phase (I) and quadrature-phase (Q) symbols or symbol components from a digital signal. The symbol components are also referred to as Cartesian symbol components. The Cartesian symbol components, I and Q, are received by the conversion component 202. The conversion component 202 translates the Cartesian symbol component into an amplitude modulation (AM) symbol components (r) and phase modulation (PM) symbol component (φ). The conversion component can comprise a COordinate Rotation DIgital Computer (CORDIC), in one example.

The phase component is provided to the phase to frequency converter 204 followed by the DPLL 206. The phase to frequency converter 204 converts the phase component signal to a corresponding frequency. The converted signal is then provided to the DPLL 206, which then generates a phase modulated carrier signal that varies or at a first frequency. The phase modulated carrier signal is provided to the mixer 212.

The amplitude components are received by the interpolation component 208. The interpolation component 208 formats the amplitude modulation signal, which is a digital signal, to a selected sampling rate. An output of the interpolation component 208 is provided to the digital to analog converter (DAC) 210, which converts the digital signal into an analog signal. An output of the DAC 210 provides the analog signal as an amplitude modulated carrier signal. The amplitude modulated carrier signal is provided to the mixer 212.

The mixer 212 combines the phase modulated carrier signal with the amplitude modulated carrier signal. The signals are combined by modulating the amplitude of the AM carrier signal onto the PM carrier signal, resulting in an output signal. The combined signal can then be transmitted and/or amplified. The mixer 212 can utilize one of many suitable mechanisms to combine the carrier signals. In one example, the mixer 212 is a linear mixer.

The DPLL 206 includes a digital controlled oscillator (DCO). Employing polar modulation, instead of vector modulation, mitigates against parasitic coupling of a power amplifier output signal to the DCO, thereby lessening the need for shielding chambers between a power amplifier and transceiver on a printed circuit board (PCB).

It is appreciated that, even with shielding, errors and distortions can be introduced into the phase modulation signals. These include amplitude modulation to frequency modulation effects. For example, parasitic frequency modulation from the power amplifier (not shown) to the DCO can introduce errors and distortions into the phase modulation signals. However, the inventors of the present invention recognize that one way to reduce the need for shielding due to parasitic frequency modulation is to compensate the DCO operation for the parasitic frequency modulation.

To mitigate unwanted errors and distortions, including the parasitic frequency modulation, the compensation unit 214 provides a correction signal to the phase modulation path. The correction signal is used to pre-distort the phase modulation signal and mitigate the unwanted errors and distortions. In one example, the correction signal is mixed with the phase modulation signal in order to pre-distort the signal.

The compensation unit 214 generates the correction signal from one or more inputs. The inputs include one or more of, samples of the amplitude modulation signal, frequency deviation samples, transmission power values, and the like.

Figure 3:
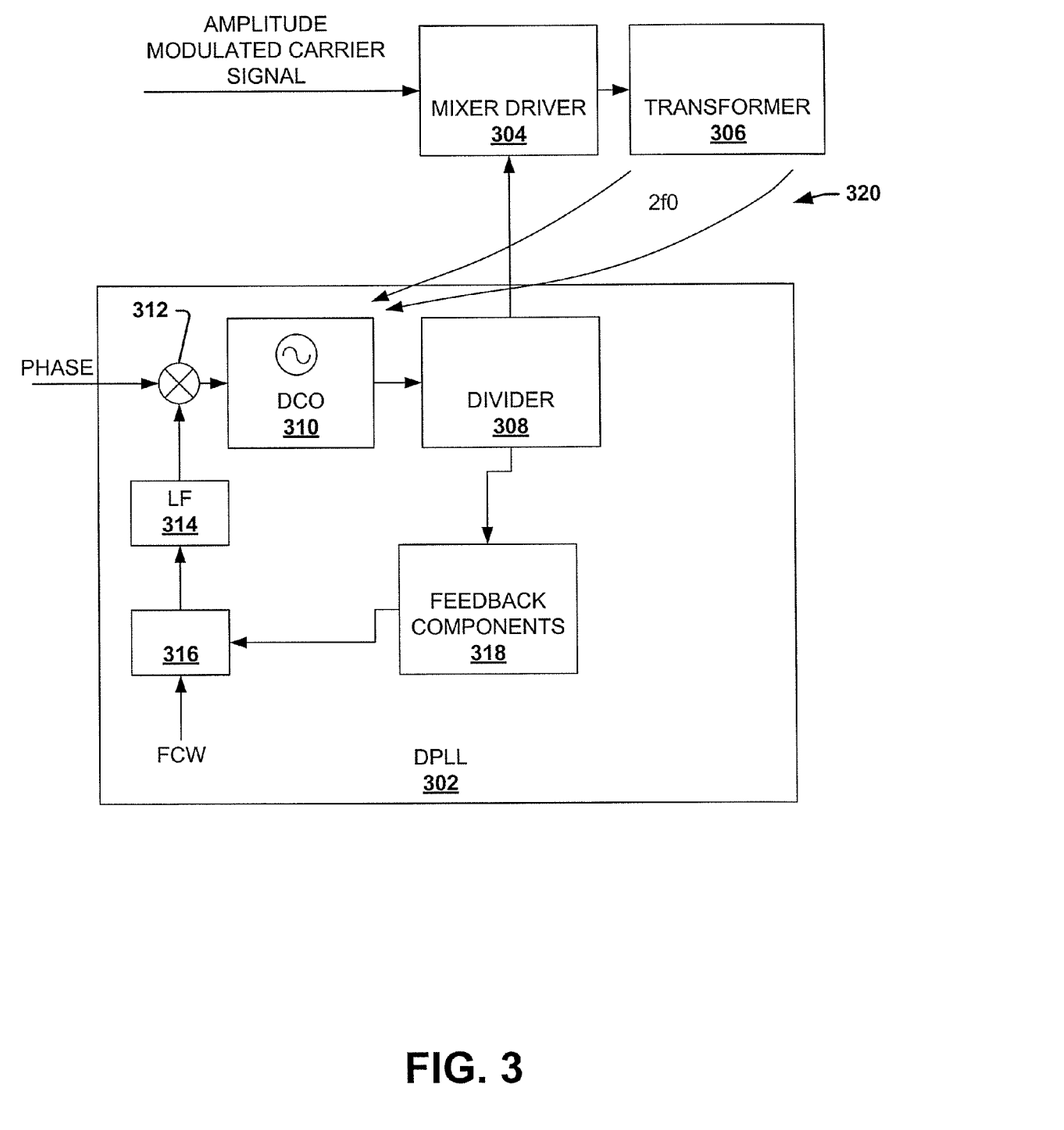
FIG. 3 is a diagram illustrating parasitic coupling of a second harmonic into a DCO for a DPLL of a communication system in accordance with an embodiment of the invention.

FIG. 3 is a diagram illustrating parasitic coupling of a second harmonic into a DCO for a DPLL of a communication system 300. The system 300 includes a DPLL 302, a mixer and driver component 304 and a transformer or coupler 306. The diagram is somewhat simplified in order to more fully illustrate the parasitic coupling.

The mixer and driver component 304 receives an amplitude modulated carrier signal from components not shown and a phase modulated carrier signal from DPLL 302. The transformer or coupler 306 couples the output signal for an antenna (not shown).

The DPLL 302 includes a DCO 310, a divider circuit 308, a mixer 312, a low pass filter 314, component 316, and feedback components 318. The mixer 312 receives a phase signal and combines it with an output signal from the low pass filter 314. The output signal of the mixer 312 is provided as an input signal to the DCO 310. The component 316 receives a frequency control word (FCW) that selects a frequency for use by the DCO 310. The component 316 can perform other functions as well. An output of the component 316 is provided as an input to the low pass filter 314. The feedback components 318 also provide a feedback signal as an input to the component 316.

The DCO 310 receives the mixer output and provides a phase modulated signal as an output. The output of the DCO is received by the divider 308, which provides the phase modulated carrier signal to the mixer and driver component 304. The divider 308 reduces the frequency of the phase modulated signal by dividing the frequency of the signal by a selected value, such as 2. Another output of the divider 308 provides a second reduced frequency signal to the feedback components 318.

In some communications systems, such as Bluetooth Enhanced Data Rate (BT-EDR) systems, variable envelope modulation is used. Then, the output signal from the mixer and driver component 304 being coupled 320 back to the DCO 310. This coupling 320 generates an unwanted AM to FM conversion, which leads to degradation of the modulation spectrum and increases a differential error vector magnitude. The unwanted conversion is also referred to as a parasitic frequency modulation or second order distortion (H2). The parasitic frequency modulation can be compensated as shown below.

Figure 4:
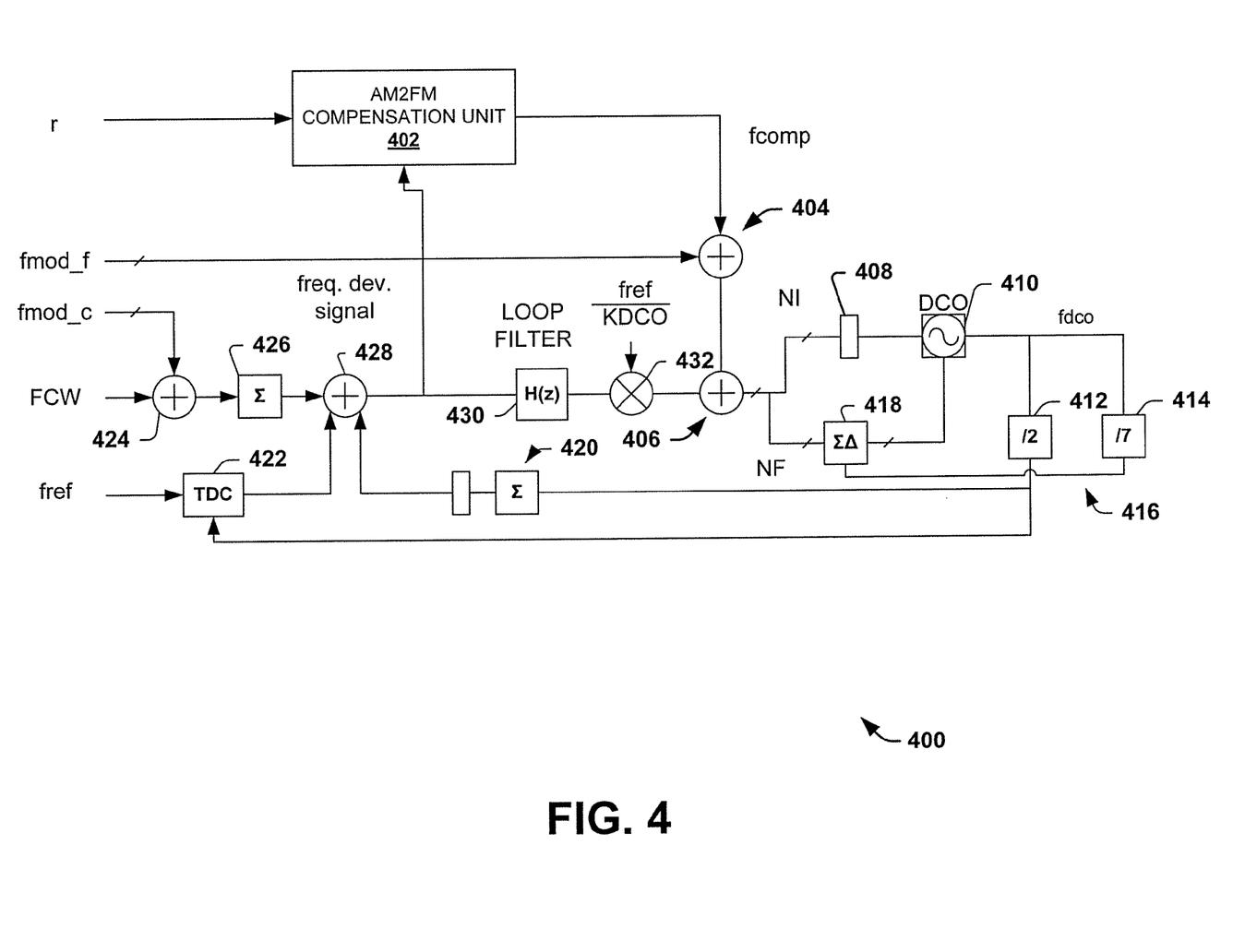
FIG. 4 is a diagram illustrating a DPLL system that includes an amplitude compensation unit in accordance with an embodiment of the invention.

FIG. 4 is a diagram illustrating a DPLL system 400 that includes an amplitude compensation unit 402. The system 400 compensates for unwanted amplitude to frequency modulation effects in polar transmitter architectures. The system performs frequency modulation as a two (2) point modulation. The DCO 410 is directly modulated in a feedforward manner by a modulation signal fmod_f. Additionally, a correction input fmod_c is added to a static frequency channel word FCW to correct or mitigate expected phase modulation of the DCO 410.

The system 400 includes the compensation unit 402, a first summation component 404, a second summation component 406, a first component 408, a DCO 410, a first divider 412, a second divider 414, a sigma delta component 418, a sigma component 420, a TDC component 422, a third summation component 424, a second sigma component 426, a fourth summation component 428, a loop filter 430, and a mixer 432.

The compensation unit 402 performs amplitude to frequency compensation according to one or more inputs, including an amplitude modulation signal "r" and a frequency deviation signal, also referred to as an error signal. In one example, a frequency deviation component generates the frequency deviation signal by comparing a DPLL output with a reference frequency or another frequency. The compensation unit provides a correction signal, also referred to as a compensated output, "fcomp", or a compensation signal to the first summation component 404. In alternate embodiments, other signals can be used in place of the amplitude modulation signal. In one example, an envelope or envelope signal is used in place of the amplitude modulation signal.

The first summation component 404 receives the correction signal fcomp and the (uncorrected) phase modulation signal fmod_f and provides an output signal there from. The output signal can also be referred to as the corrected phase modulation signal. The second summation component 406 receives the output signal from the first summation component and an output from the mixer 432. The second summation component 406 provides an output that is the sum of its inputs to components 408 and 418. The output signal of the second summation component can also be referred to as the corrected phase modulation signal.

The output of the second summation component 406 is receives by component or stage 408, which then passes the signal to the DCO 410. The output of the second summation component 406 is also received by the sigma delta modulator or component 418. The DCO 410 generates a DCO output signal (fdco) based on its input from stage 408 and an output from the delta sigma component 418. The DCO output signal is then received by divider circuits 416, which include a first divider 412 and a second divider 414. The first divider 412 divides the DCO output signal frequency by two (2) and the second divider 414 divides the DCO output signal frequency by seven (7). The output of the second divider 414 is provided to the delta sigma component 481.

The first sigma component 420 or integrator and stage receives an output of the first divider 412 and provides its output to the fourth summation component 428 as a first sigma signal. The TDC 422 component also receives the output of the first divider and provides an output to the fourth summation component 428. The TDC 422 operates on a reference frequency (fref) and an output of divider 412. The TDC is configured to measure a time delay between the phase of the reference frequency (fref) and the phase of the output of divider 412. The output from the TDC is a digital word representing the phase/time error between the reference frequency and the output of the divider 412.

The correction input fmod_c is added to the frequency control word FCW by the third summation component 424. The sum is provided to a second sigma component 426, which provides a second sigma signal to the fourth summation component 428. The fourth summation component 428 adds the TDC output signal to the second sigma signal and subtracts the first sigma signal to provide a phase detector signal as an output. The phase detector signal is also utilized as the error signal and, in one example, takes the form of a digital word.

The phase detector signal is also provided to the loop filter 430, which provides its output to the mixer 432. The loop filter 430 filters and processes the phase detector signal and provides a frequency control word, which represents an error or variation between an instantaneous operating frequency and a newly desired operating frequency of the DCO 410.

Polar modulation communication systems include an amplitude modulation path and a phase modulation path. The amplitude modulation path generates the amplitude modulation signal and amplitude carrier signal. The phase modulation path generates the phase modulation signal and phase carrier signal. If amplitude and phase modulation paths of a communication system utilizing DPLL 400 were perfectly matched, the transmitted signal is removed from the PLL loop dynamics and the frequency deviation signal, also referred to as the phase detector signal, remains zero (0). However, parasitic coupling of the second harmonic of the carrier signal causes a parasitic modulation of the DCO 410. The DPLL attempts to correct the perceived phase modulation by utilizing the correction input (fmod_c). However, low pass characteristics of the DPLL 400 cause the DPLL 400 to react slowly to perturbations and thus the DPLL 400 achieves only a limited suppression of the parasitic modulation. As a result, the phase detector signal is used as an error signal by the compensation unit 402 to more effectively compensate for the parasitic modulation.

One or more inputs, including the frequency deviation signal and the amplitude modulation signal r[k], are used by the compensation unit 402 to generate the correction signal. The compensation unit 402 uses one or more suitable approaches to generate the correction signal. In one example, a look up table (not shown) approach is used. The lookup table has 2 stored values per entry, the squared and cubic magnitudes of the amplitude modulation signal, corresponding to an instantaneous address in the lookup table. The error signal is utilized to update addresses in the lookup table. The update of the lookup table is performed at a rate of a phase detector clock rate, which is rate at which the frequency deviation signal is generated. To update the table, first an instantaneous frequency error or variation is determined as a difference of a current frequency deviation value minus a previous frequency deviation value and multiplied by a step size parameter. The instantaneous frequency error is used to update the table entry value at the address of r[k-k0], where k0 is the delay between the compensation or correction signal output value fcomp[k-k0] and the current frequency deviation value p[k]. The correction or compensation signal fcomp[k] should also be aligned in time respect to a transmit carrier signal s(t). As a result, the time delay of the compensating signal path should be adjusted to the delay of the envelope signal path.

Figure 5A:
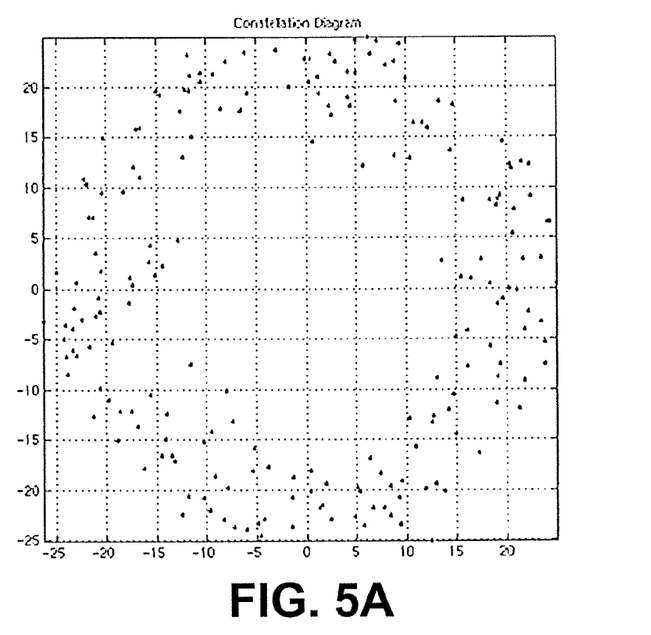
FIGS. 5A and 5B are graphs illustrating an 8PSK constellation diagrams for 4 MHz peak frequency distortion without and with compensation.
Figure 5B:
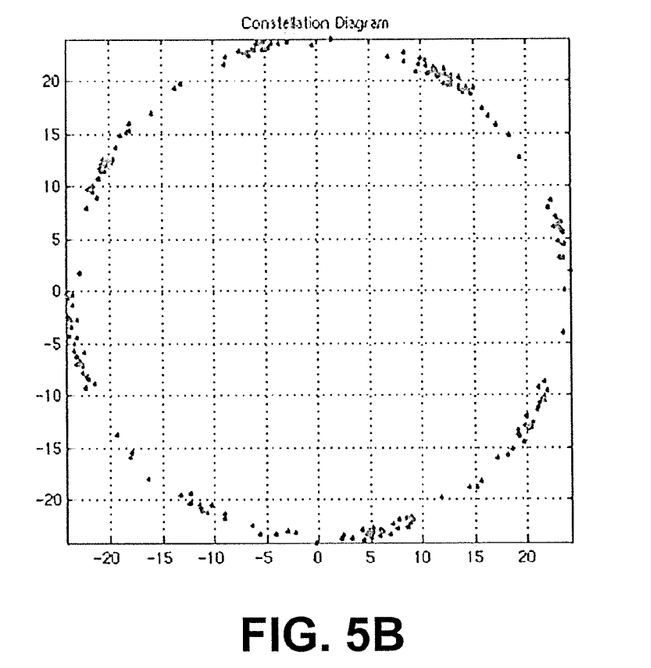

FIGS. 5A and 5B are constellation diagrams illustrating an 8PSK constellation diagram for 4 MHz peak frequency distortion. The diagrams are simulations and provided for illustrative and non-limiting purposes. FIG. 5A depicts the constellation diagram without compensation or correction. FIG. 5B depicts the constellation diagram with compensation or correction as shown above. Thus, it can be seen that the constellation diagram with compensation provides for greater uniformity and closer constellation points than without compensation.

Furthermore, differential error vector magnitude (DEVM) values can be determined for created output signals with and without compensation. Without compensation, a DEVM root mean square value of 20.788, a DEVM peak value of 52.74, and a DEVM 99 value of 30 are obtained. With compensation, a DEVM root mean square value of 5.589, a DEVM peak value of 16.209, and a DEVM 99 value of 13.71 are obtained. Thus, it can be seen that the compensation shown above results in reduction of the DEVM values.

The inventors of the present invention recognize that communication systems utilize a ramp based training sequence. The ramp is typically a smooth, controlled increase of transmission power over a specific period of time. One example of such a system is a GFSK ramp, present in all Bluetooth packets as required by the Bluetooth standard. The GFSK ramp can be utilized as a training sequence to characterize the unwanted frequency shift generated by amplitude modulation to frequency modulation distortion or effects (AM to FM distortion). The characterization of the unwanted frequency shift can then be utilized by a compensation unit, such as compensation unit 402 in FIG. 4, to generate a compensation signal to mitigate or correct for the unwanted frequency shift.

Figure 6:
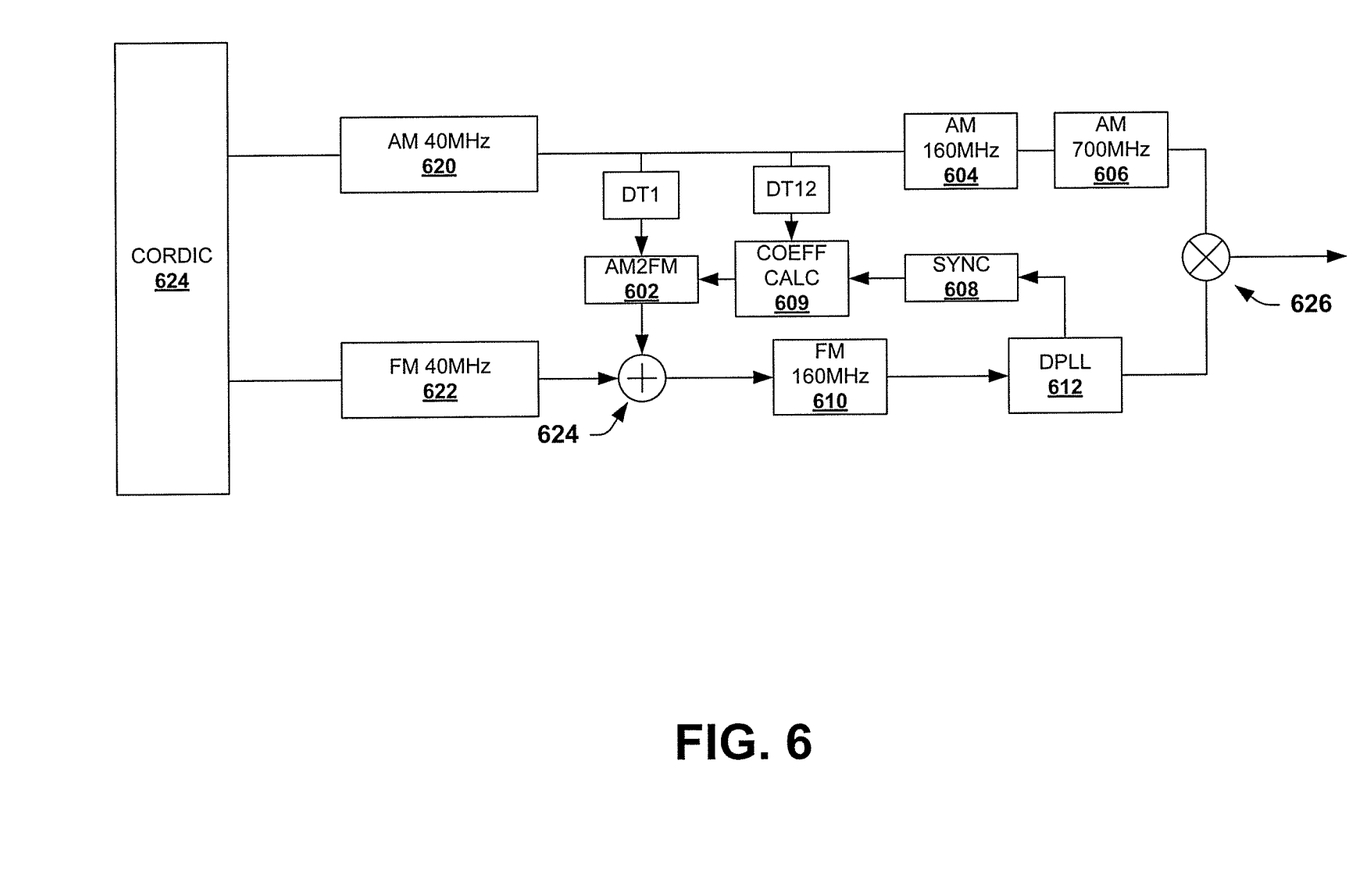
FIG. 6 is a block diagram illustrating a communication system in accordance with an embodiment of the invention.

FIG. 6 is a block diagram illustrating a communication system 600 in accordance with an embodiment of the invention. The system 600 includes a compensation unit 602 that provides a correction signal to a phase modulation path in order to compensate for unwanted distortions or errors, including unwanted frequency shift and other amplitude modulation to frequency modulation effects.

The system 600 includes a conversion component 624 that receives symbol components, such as Cartesian symbol components and translates the received symbol components into phase and amplitude components. The phase component is provided to frequency modulation component 622 and the amplitude component is provided to amplitude modulation component 620.

The amplitude modulation component 620 generates or modulates an amplitude signal from the amplitude component at a selected frequency. The amplitude modulation component 620 operates at a suitable frequency, such as 40 MHz, to generate the amplitude signal. A second amplitude modulation component 604 modulates the amplitude signal to a higher frequency. In one example, the higher frequency is 160 MHz. A third amplitude modulation component 606 modulates the amplitude signal to a carrier frequency. In one example, the carrier frequency is 700 MHz. The amplitude signal is then provided to mixer 626.

The phase components are received by a phase to frequency converter 622, which converts the phase components to a selected frequency as a phase signal. In one example, the selected frequency is 40 MHz. The phase signal is added to a compensation signal at summation component 624. As stated above, the compensation signal at least partially compensates for distortions or errors, including unwanted frequency shifts. The phase signal is converted to a higher frequency at modulation component 310. In one example, the higher frequency is 160 MHz. The phase signal is provided to DPLL 612 whose output represents a phase modulated carrier signal. The phase modulated carrier signal is provided to the mixer 626, where it is combined with the amplitude modulated carrier signal and provided as an output signal. The output signal can be further amplified, transmitted, and the like.

The DPLL 612 also provides a phase differential signal to a synch component 608. An output of the synch component 608 is provided to a coefficient calculation component 609 as a frequency deviation signal. Further, a first amplitude signal, corresponding to the output of component 620 is delayed by DT12 and is also provided to the coefficient calculation component 609. The coefficient calculation component 609 generates or calculates characterization coefficients, which are provided as an output to the compensation unit. In one example, the coefficients are generated via a least squares estimation.

The frequency deviation signal and a second amplitude signal made of the amplitude signal from component 620 and delayed by DT1 are provided to the compensation unit 602. The amplitude compensation unit 602, also referred to as an AM to FM compensation unit, generates the correction signal according to the frequency deviation signal and the second amplitude signal delayed by DT.

The compensation unit 602 is configured to operate with two phases, an estimation phase and a pre-distortion phase. During the estimation phase, the compensation unit 602 or the coefficient calculation component 609 utilizes a magnitude ramp portion of a frame and instantaneous frequency deviation values to estimate phase modulation distortions, including those introduced into the phase modulation signal from the amplitude modulation path, also referred to as amplitude modulation to frequency modulation effects. These effects include second order distortions, such as shown with respect to FIG. 3.

A magnitude ramp is present during certain types of frame configurations, such as GFSK modulation. The "instantaneous" frequency deviation values or samples are provided by the DPLL 612 via the SYNC component 608. The samples can be provided in the form of the frequency deviation signal. An H2 distortion effect results from frame transmission conditions including, but not limited to, frequency channel, max power, temperature, chip process, and the like. The compensation unit 602 utilizes the estimated distortion to pre-distort the phase modulation signal by providing the frequency compensation or correction signal to the summation component 624. It is also noted that the time delay of the frequency compensation signal should be adjusted to a delay of the envelope signal path so that the frequency compensation signal is aligned in time respect to the output signal provided at the mixer 626.

It is appreciated that the coefficient calculation component 609 and the compensation unit 602 can be configured as separate components and/or a single component.

In one example, the estimated distortion is calculated for each frame. However, the inventors of the present invention recognize that a training or ramp portion of subsequent frames may be substantially similar to a current or previous frame. Thus, in another example, the estimated distortion is reused for a period of time or a selected number of frames to mitigate power consumptions and computation.

Figure 7:
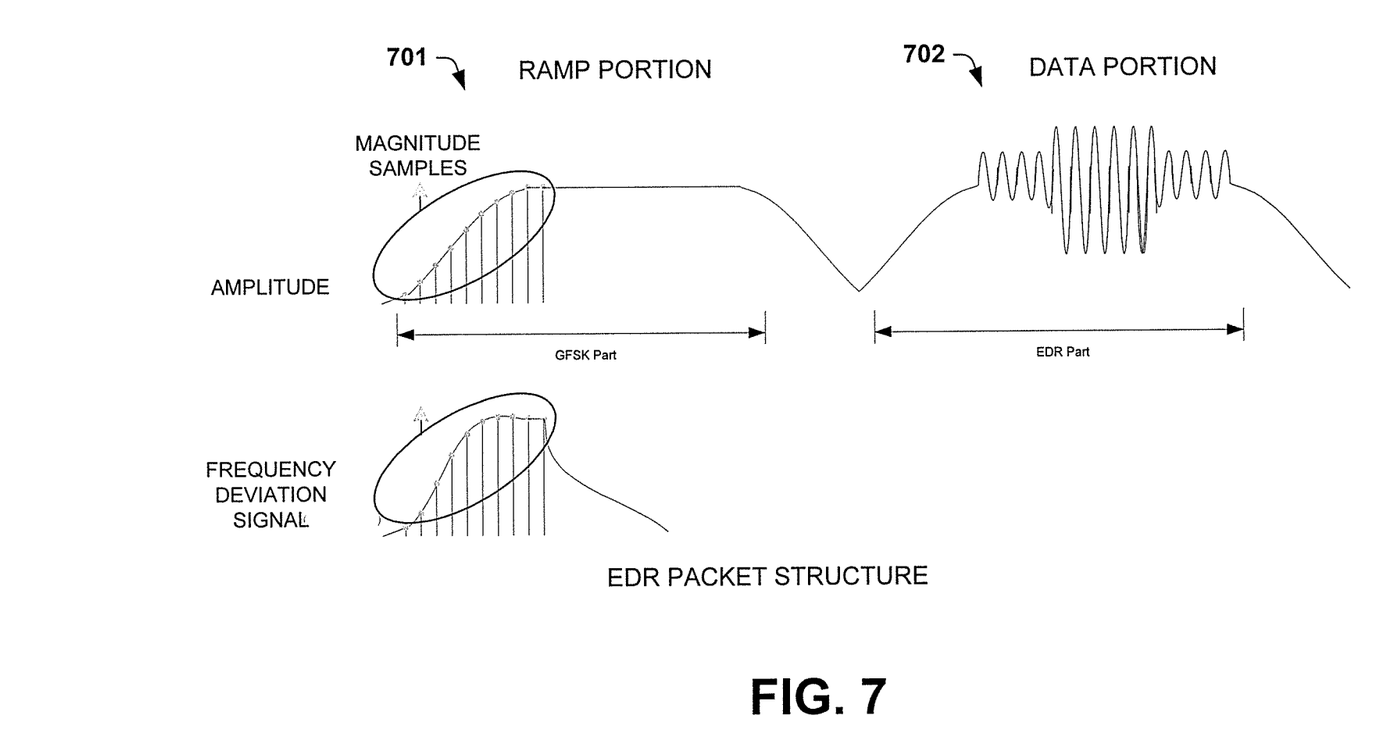
FIG. 7 is a graph showing an example of frame that can be utilized to mitigate unwanted error or distortions.

FIG. 7 is a graph showing an example of frame that can be utilized to mitigate unwanted error or distortions. The example frame shown is an enhanced data rate (EDR) frame according to the Bluetooth standard. The frame includes a training or ramp portion 701 and a data portion 702. The ramp portion 701 is a GFSK ramp in this example. The data portion 702 is an EDR portion. Additionally, the graph shows frequency deviation values 703. It can be seen that the ramp portion 701 includes a sweep of magnitude values. The ramp 701 includes a smooth, controlled increase of magnitude or transmission power over a selected period of time.

Figure 8:
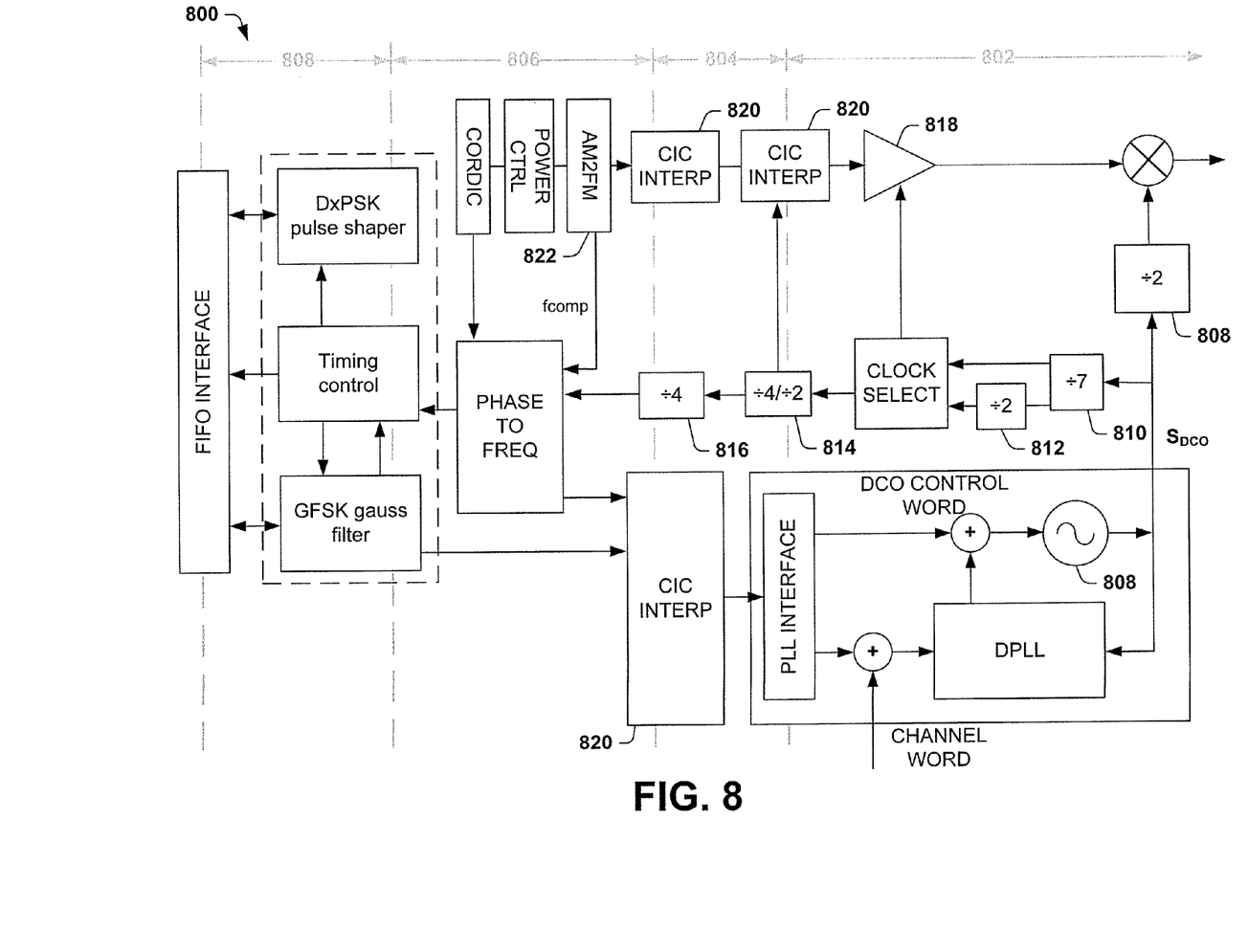
FIG. 8 is a diagram illustrating a Bluetooth polar transmitter as provided in accordance with an embodiment of the invention.

FIG. 8 is a diagram illustrating a Bluetooth polar transmitter 800 as provided in accordance with an embodiment of the invention. The transmitter 800 includes a compensation unit 822 to mitigate unwanted errors and distortions from the amplitude modulation path. FIG. 8 illustrates a polar transmitter having a plurality of frequency dividers configured to generate three different "frequency regions", wherein the transmitter operations performed in each of the frequency regions are dependent upon a reduction of a DCO frequency equal to twice the Bluetooth operating frequency (e.g., 4804 to 4960 MHz). It will be appreciated that FIG. 8 illustrates a simplified example of a divider configuration that may be used to generate a number of frequency regions and is not intended as a limiting example.

In a first region 802, the frequency of the output signal $S_{DCO}$ from DCO 808 is divided by frequency dividers 810 to generate operating frequencies of 686 MHz-708 MHz or collectively by divider 810 and 812 to generate operating frequencies of 343 MHz-354 MHz. The frequencies in the first region 802 are used to generate a clock signal that drives sampling of DAC 818 to generate an analog amplitude modulated signal having a desired frequency.

In a second region 804, the frequency of the output signal $S_{DCO}$ from DCO 808 is further divided by divider 814 to generate an operating frequency of 171 MHz-177 MHz for certain digital operations. As shown in FIG. 8, a further integer division by 4 (or 2 depending on the selective use of dividers 810 and 812) generates an a signal for digital operations in both the amplitude and modulation path. These digital operations may comprise CIC interpolation of the AM signal and/or PM signal(s) by interpolator(s) 820.

In a third region 806, the frequency of the output signal $S_{DCO}$ from DCO 808 is further divided by divider 816 to generate an operating frequency of 42 MHz-44 MHz. As shown in FIG. 8, a further integer division by 4 generates a signal for other operations in the digital part of the polar transmitter such as the CORDIC and pulse shaping filter respectively.

A further divider (not shown) may be used to divide the 42 MHz-44 MHz signal down to 10-11 MHz clock signal for use in a fourth region 808. The 10-11 MHz clock signal may be used in digital operation of additional components such as the DxPSK pulse shaper and/or timing control, etc.

The compensation unit 822 operates in the third region to mitigate unwanted phase signal errors and distortions resulting from the amplitude modulation path, also referred to as amplitude modulation to frequency modulation effects. The compensation unit 822 derives an estimate of the distortion effect from ramp values and frequency deviation values (in the form of a frequency deviation signal) during a ramp portion of a communication sequence. During data portion(s) of the communication sequence, the compensation unit 822 utilizes the estimate to pre-distort the phase modulation signal to mitigate for the unwanted errors and distortions.

Figure 9:
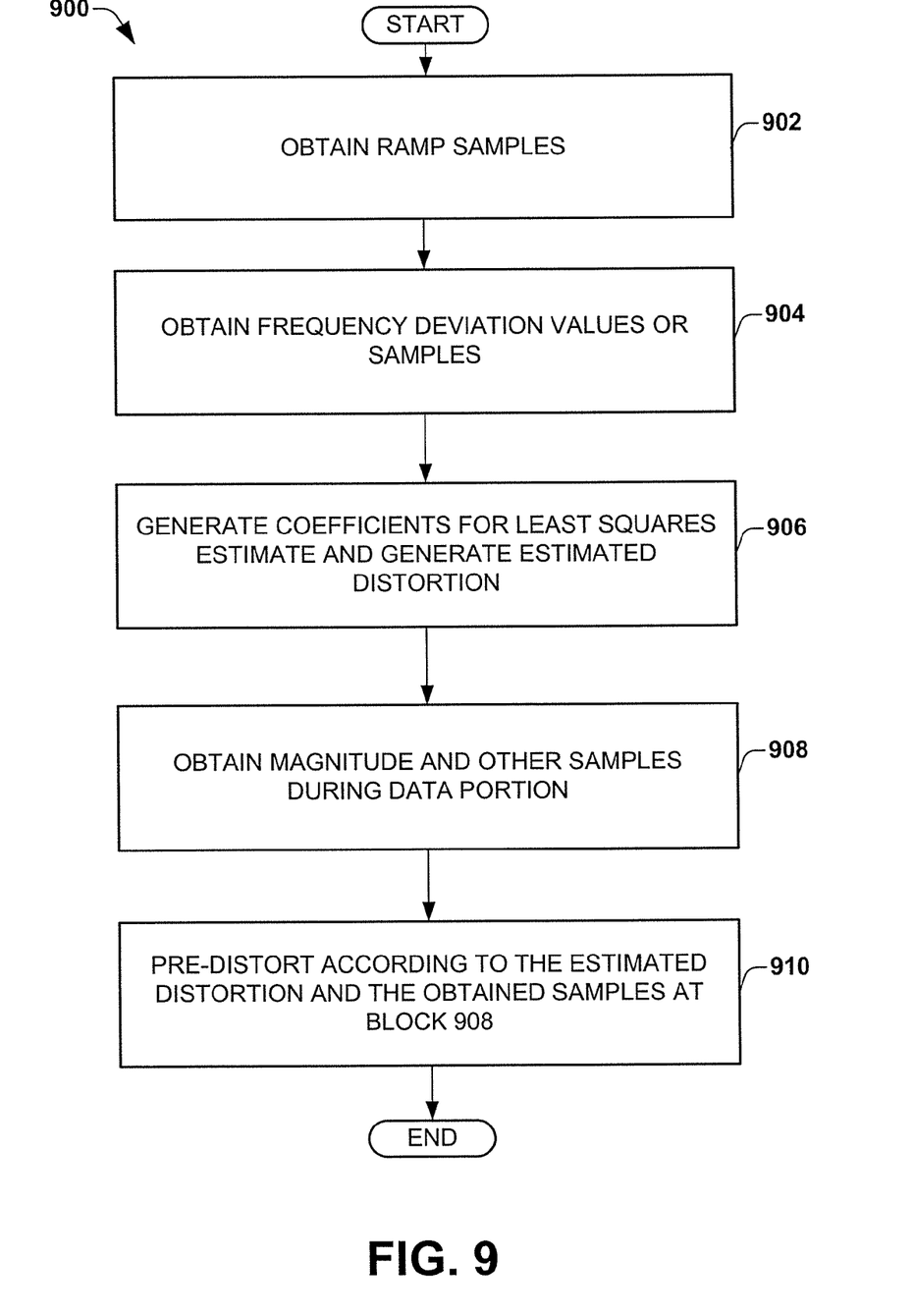
FIG. 9 is a flow diagram illustrating a method to mitigate phase and frequency distortions resulting from an amplitude modulation signal.

FIG. 9 is a flow diagram illustrating a method 900 to mitigate phase and frequency distortions resulting from an amplitude modulation signal. The method 900 utilizes a ramp or training portion of a communication sequence to generate an estimated distortion. Then, during a data portion, the estimated distortion is utilized with other inputs or signals to correct or pre-distort a signal to at least partially account and mitigate the estimated or actual distortion.

The method begins at block 902, where ramp samples of an amplitude modulation signal for a ramp portion of a communication sequence are obtained. The communication sequence includes an amplitude ramp portion as a training sequence and a data portion. In one example, a data packet according to the Bluetooth standard comprises the communication sequence. In this example, the ramp portion is a training portion or GFSK ramp, which includes an amplitude signal that sweeps from zero to a maximum value. FIG. 7, discussed above, provides an example of a communication sequence that includes a ramp portion 701.

Frequency deviation values or samples are obtained or derived at block 904. The frequency deviation values can be obtained from a DPLL component, such as those shown above. The frequency deviation values are instantaneous sampled values obtained by differentiation of DPLL phase comparator samples. In one example, the frequency deviation values are provided in the form of a frequency deviation signal.

Characterization coefficients are generated during an estimation phase at block 906 according to the frequency deviation values and the ramp samples. The characterization coefficients are used to generation a distortion estimate. In one example, an order 2 and 3 polynomial least square fitting of the frequency deviation versus the magnitude is performed to yield the characterization coefficients. The distortion estimate is representative of linear or non-linear distortion from an amplitude modulation path.

Magnitude samples of the amplitude modulation signal are obtained during a data portion of the communication sequence at block 908. Other samples and/or signals can also be obtained during the data portion including frequency deviation samples, transmission power samples, and the like. The magnitude samples, and possibly other inputs, are combined with the characterization coefficients to generate the estimated distortion. The other inputs can include frequency deviation samples, transmission power, and the like.

The estimated distortion is utilized during a pre-distortion phase to pre-distort a phase modulation signal according to the magnitude samples at block 910. The pre-distortion can be accomplished by generating a phase compensation signal, also referred to as a correction signal, and combining it with the phase modulation signal.

While the above method 900 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

The following discussion illustrates a mechanism to generate a distortion estimate, which includes amplitude modulation to frequency modulation effects.

Magnitude ramp samples, noted as $m_1$ to $m_N$ hereafter, and instantaneous frequency deviation samples, noted as $y_1$ to $y_N$ hereafter, are obtained as shown above. The magnitude ramp samples can be provided in the form of an amplitude modulation signal and the frequency deviation samples can be provided in the form of a frequency deviation signal. The ramp samples and frequency deviation samples are obtained during the ramp or training portion of a frame. In one example, 26 ramp and frequency deviation samples are obtained for a 1 microsecond ramp sampled at 26 MHz. In another example, 75 ramp and frequency deviation samples are obtained for a 3 micro second ramp. A large number of samples, such as greater than 26, mitigates phase noise effects. An order 2 and 3 polynomial least square fitting of the frequency deviation samples versus the magnitude ramp samples is performed. The fitting aims at determining an optimum or suitable value for $a_2$ and $a_3$, second and third order coefficients of the polynomial.

The estimation is performed over N samples where Y is a vector representing the frequency deviation samples $y_1$ to $y_N$ and M is an array representing the ramp samples $m_1$ to $m_N$. A is a coefficient vector representing the $2^{nd}$ and $3^{rd}$ order coefficients, $a_2$ and $a_3$.

$$Y = MA$$

$$\begin{bmatrix} y_1 \\ y_2 \\ \vdots \\ y_N \end{bmatrix} = \begin{bmatrix} m_1^2 & m_1^3 \\ m_2^2 & m_2^3 \\ \vdots & \vdots \\ m_N^2 & m_N^3 \end{bmatrix} \begin{bmatrix} a_2 \\ a_3 \end{bmatrix}$$

The least squares estimate of the coefficients vector A is equal to:

$$\hat{A} = (M^T M)^{-1} M^T Y = HY$$

Once the $2^{nd}$ and $3^{rd}$ order coefficients, $a_2$ and $a_3$ have been obtained, the H2 effect can be estimated and compensation can be applied to a remaining portion of the communication, such as the rest of the frame. The corrected phase modulation signal, denoted as $y_{corrected}$, can be obtained from the following equation where y represents a phase modulation signal (uncorrected) and $[m^2\ m^3]\hat{A}$ represents the correction signal.

$$y_{corrected} = y - [m^2\ m^3]\hat{A}$$

The above calculations involve a fair number of arithmetic operations. The calculation complexity of M is on the order of O(2N). The calculation complexity of H is on the order of (8N+8). The calculation complexity of W is on the order of (2N). The total calculation complexity is on the order of (12N+8). The complexity can be reduced by utilizing pre-calculated values stored. For example, the M and H matrices can be pre-calculated using the known ramp shape and stored in the lookup table for a given peak magnitude of the ramp (assuming a ramp shape is known and does not change, but peak magnitude reached at end of ramp-up depends on current Tx power). The pre-calculated H matrix can then be utilized to estimate the H2 coefficients, $a_2$ and $a_3$ by a single matrix/vector multiplication. This results in a complexity reduction from O(12N+8) down to O(2N).

Figure 10:
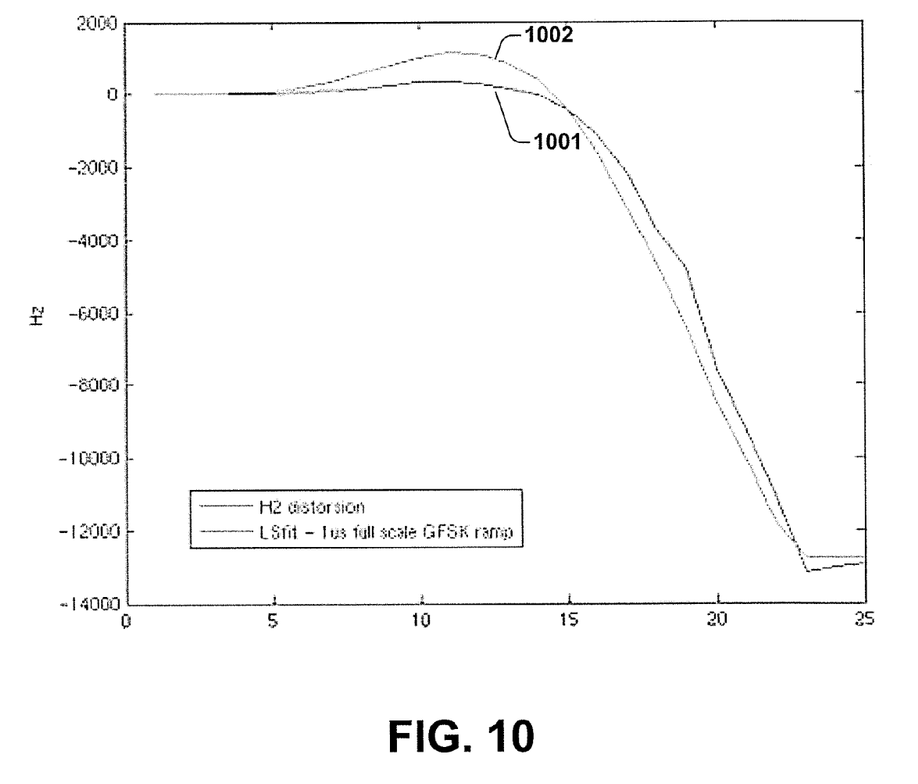
FIG. 10 is a graph illustrating an example of second order distortion versus a least squares estimate of distortion.

FIG. 10 is a graph illustrating an example of H2 distortion versus a least squares H2 estimate obtained as shown above. The graph depicts samples on an x-axis and frequency on a y-axis. The samples were obtained with a GFSK ramp and include 26 samples.

The H2 distortion is shown on line 1001 and the least squares H2 estimate is shown on line 1002. It can be seen that the least squares H2 estimates tracks and is substantially similar to the H2 distortion.

When utilizing pre-calculated H matrix, the corrected phase modulation signal is further scaled according to transmission power. A scaling factor, based on the transmission power, can then be applied to adapt the correction signal, also referred to as the compensated output signal. The scaling factor, denoted as alpha, is a function of a magnitude sample m and a magnitude reference value $m_{ref}$. The magnitude reference value can be a maximum ramp value considered for the calculation of the stored H matrix used for the estimation phase. The equations are shown below:

$$\alpha = m/m_{ref}$$
$$y_{corrected} = y - \begin{bmatrix} \frac{m^2}{\alpha^2} & \frac{m^3}{\alpha^3} \end{bmatrix} \hat{A}$$
$$\alpha = m/m_{ref}$$
$$y_{corrected} = y - \begin{bmatrix} \frac{m^2}{\alpha^2} & \frac{m^3}{\alpha^3} \end{bmatrix} \hat{A}$$
$$y_{corrected} = y - \left( m^2 \frac{a_2}{\alpha^2} + m^3 \frac{a_3}{\alpha^3} \right)$$

The corrected phase modulation signal, denoted as $y_{corrected}$, can be obtained from the following equation where y represents a phase modulation signal (uncorrected). The remaining portion of the equation represents the compensation signal.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A communication system comprising:
   a digital to analog converter configured to receive a first signal;
   a compensation unit having one or more inputs, the compensation unit configured to obtain amplitude samples of the first signal at a first input of the one or more inputs and generate a correction signal according to the one or more inputs, wherein the correction signal accounts for distortions from an amplitude modulation path; and
   a summation component configured to receive a phase modulation signal and the correction signal and to generate a corrected phase modulation signal there from.

2. The system of claim 1, further comprising digital phase locked loop circuit configured to generate a carrier phase modulation signal from the corrected phase modulation signal.

3. The system of claim 2, wherein the digital phase locked loop circuit is further configured to provide a frequency deviation signal to a second input of the one or more inputs of the compensation unit.

4. The system of claim 3, wherein the frequency deviation signal represents an instantaneous frequency deviation of the phase modulation signal.

5. The system of claim 3, wherein the compensation unit is configured to receive a transmission power signal at a third input of the one or more inputs, and the compensation unit scales the correction signal according to the transmission power.

6. The system of claim 1, wherein the first signal and the phase modulation signal are of a communication sequence having a first portion and a second portion, wherein the compensation unit is configured to develop a frequency distortion estimate during a first portion of communication sequence and utilizes the distortion estimate during a second portion of the communication sequence to generate the correction signal.

7. The system of claim 6, wherein the first portion is a magnitude ramping portion and the second portion is a data transfer portion.

8. The system of claim 6, wherein the compensation unit is configured to utilize a least squares estimation to develop the frequency distortion estimate.

9. The system of claim 6, wherein the compensation unit is configured to include a lookup table and to utilize the lookup table to develop the frequency distortion estimate.

10. The system of claim 9, wherein the first signal is an amplitude modulation signal and a current amplitude sample of the amplitude modulation signal identifies an entry in the lookup table and the identified entry is utilized to generate the distortion estimate.

11. The system of claim 6, wherein the compensation unit includes a coefficient calculation component configured to develop second and third order coefficients utilized by the compensation unit to develop the amplitude distortion estimate.

12. A communication system comprising:
    a converter configured to provide a phase components signal and an amplitude components signal;
    an interpolation component configured to generate an amplitude modulation signal from the amplitude components signal;
    a digital to analog converter configured to generate an amplitude carrier modulation signal from the amplitude modulation signal;
    a phase to frequency converter configured to generate a phase modulation signal from the phase components signal;
    a compensation unit having one or more inputs, the compensation unit configured to receive one or more input signals and generate a correction signal according to the one or more input signals, wherein the one or more input signals include amplitude samples of the amplitude modulation signal and wherein the correction signal accounts for distortions from the amplitude modulation signal;

a summation component configured to receive the phase modulation signal and the correction signal and to generate a corrected phase modulation signal there from;

a digital phase locked loop configured to receive the corrected phase modulation signal and to generate a phase carrier modulation signal; and a mixer to mix the phase carrier modulation signal and the amplitude carrier modulation signal into an output transmit signal.

13. The system of claim 12, wherein the compensation unit is configured to utilize a least squares estimation to develop a distortion estimate.

14. The system of claim 13, wherein the compensation unit is configured to generate the correction signal at least partly according to the distortion estimate.

15. The system of claim 12, further comprising a coefficient estimator that generates coefficients based on ramp samples of the amplitude modulation signal and frequency deviation samples of the phase modulation signal.

16. The system of claim 15, wherein the coefficients are provided as a second input to the one or more inputs of the compensation unit.

17. A method of estimating distortion in a communication system, the method comprising:
    obtaining ramp samples of a first portion of a communication sequence;
    obtaining frequency deviation samples of the first portion of the communication sequence;
    developing a distortion estimate according to the ramp samples and the frequency deviation samples, wherein the distortion estimate estimates phase distortion resulting from an amplitude modulation path; and
    generating a correction signal according to the distortion estimate and magnitude samples of a data portion of the communication sequence.

18. The method of claim 17, further comprising applying the correction signal to the communication sequence to mitigate unwanted distortions.

19. The method of claim 18, wherein applying the correction signal comprises combining the correction signal with an uncorrected phase modulated signal to yield a corrected phase modulated signal.

20. The method of claim 17, wherein the first portion is a training sequence and includes a smooth, controlled increase of transmission power.

* * * * *